United States Patent [19]

Heiberger

[11] 4,224,202

[45] Sep. 23, 1980

[54] ALKYD-MONOMER HIGH-SOLIDS COATING COMPOSITION

[75] Inventor: Philip Heiberger, Broomall, Pa.

[73] Assignee: E. I. Du Pont de Nemours and Company, Wilmington, Del.

[21] Appl. No.: 4,480

[22] Filed: Jan. 18, 1979

Related U.S. Application Data

[63] Continuation-in-part of Ser. No. 887,798, Mar. 17, 1978, abandoned.

[51] Int. Cl.$^2$ ............................................. C09D 3/66
[52] U.S. Cl. ........................... 260/22 CB; 260/22 CA; 260/23 P
[58] Field of Search ............ 260/22 CB, 22 CA, 23 P

[56] References Cited

U.S. PATENT DOCUMENTS

| | | | |
|---|---|---|---|
| 3,124,549 | 3/1964 | Salgado et al. | 260/22 CB |
| 3,445,410 | 5/1969 | Coulter | 260/22 M |
| 3,657,387 | 4/1972 | Stahly et al. | 260/23 P |
| 3,743,615 | 7/1973 | Yethon | 260/22 CB |
| 3,901,837 | 8/1975 | Gottesman et al. | 260/22 R |
| 3,988,272 | 10/1976 | Watts et al. | 260/22 CB |
| 4,014,830 | 3/1977 | Rumfield | 260/22 CB |
| 4,045,392 | 8/1977 | Callahan et al. | 260/22 M |
| 4,049,599 | 9/1977 | Lott | 260/22 M |
| 4,111,871 | 9/1978 | Aritomi | 260/23 P |
| 4,145,503 | 3/1979 | Emmons et al. | 260/23 P |

*Primary Examiner*—Ronald W. Griffin

[57] ABSTRACT

A high-solids coating composition containing an unsaturated fatty acid alkyd resin, an alkyl dimethacrylate or trimethacrylate monomer, a protected cobalt oxime catalyst, and a polar solvent. The di- or trimethacrylate monomer crosslinks with the alkyd and becomes part of the solid paint film.

21 Claims, No Drawings ated to Societe Continentale Parker, and corresponding Belgian Patent No. 842,167 (1967).

ALKYD-MONOMER HIGH-SOLIDS COATING COMPOSITION

CROSS-REFERENCE TO RELATED APPLICATION

This is a continuation-in-part of application Ser. No. 887,798, filed Mar. 17, 1978, and now abandoned.

BACKGROUND OF THE INVENTION

The present invention is concerned with coating compositions, particularly high-solids alkyd paints. p In order to minimize the amount of solvent required to coating compositions, most of which is released to the atmosphere during painting operations, it is desirable to produce coating compositions having relatively small amounts of solvents and relatively large amounts of solids. The time and energy required to cure such coatings are important parameters.

Alkyd paints are relatively inexpensive, and it would be desirable to have a high-solids, alkyd-based paint which could be cured at low temperatures in a short period of time. U.S. Pat. No. 4,014,830—Rumfield (Mar. 29, 1977), assigned to Celanese Coatings and Specialities Company uses up to 10 weight percent of a polyacrylate or polymethacrylate ester of a polyol as a modifier in an alkyd resin to allegedly speed up the through-dry of the coatings and to permit obtaining harder films after overnight drying. Although methacrylates are mentioned, the disclosure focuses on acrylates including trimethylol propane triacrylate. Similar technology using 0.1 to 10% monomer is disclosed in French Patent Publication No. 2,312,302 (1976), assigned to Societe Continentale Parker, and corresponding Belgian Patent No. 842,167 (1967).

U.S. Pat. Nos. 3,743,615—Yethon (1973) and 4,049,599—Lott (Sept. 20, 1977) discuss methods of increasing the drying speed or the solids content of paints.

German Offenlegunschrift No. 2,710,032, published Sept. 9, 1977 and based on two U.S. applications filed Mar. 8, 1976, discloses the use of dicyclopentenyl acrylate or methacrylate as a reactive, nonvolatile monomer in an alkyd resin paint which can also contain a cobalt salt and a volatile ketoxime. However, the (meth)acrylate acid ester of dicyclopentadiene used in that patent has just one acrylic or methacrylic group.

It would be desirable to have a paint which is capable of application with less solvent and curing at a higher speed and lower temperatures than is available from the prior art.

SUMMARY OF THE INVENTION

The present invention provides a coating composition comprising an unsaturated fatty acid alkyd resin, an alkyl dimethacrylate or trimethacrylate monomer, a cobalt salt effective as a catalyst for the oxidative crosslinking of the alkyd resin, a complexing agent to block the cobalt catalyst, and a polar solvent; wherein the coating composition contains at least about 50% of the alkyd resin, about from 10 to 40% of the methacrylate monomer, and at least about 10% polar solvent. (Percentages, parts and proportions herein are by weight based on the alkyd resin plus the methacrylate monomer, except where indicated otherwise).

A particularly preferred embodiment is about 70% alkyd resin, 25% hexanediol dimethacrylate, 5% dibutyl phthalate, 0.1% cobalt, 0.4% methyl ethyl ketone oxime, and 20% isopropyl alcohol.

About 20-85% of the solvent can be water in water-soluble coating compositions of the invention.

Coating compositions of the invention containing 50 to 60 or higher percent solids precursors (alkyd and monomer) can be cured on substrates overnight or sometimes in three to four hours at ambient temperatures or in a shorter time such as 10-20 minutes at slightly elevated temperatures such as 58°-82° C.

A peroxide, such as preferably methyl ethyl ketone peroxide, may be added to the paint shortly before it is applied to the substrate to enhance oxidative crosslinking cure. The addition is most readily handled by adding the peroxide in a spraying procedure.

DETAILED DESCRIPTION OF THE INVENTION

The present invention utilizes a modification of normal alkyd paint mechanisms. Although the following is thought to constitute an explanation of how the invention operates, it is merely a hypothesis offered for better understanding of the invention. Applicant should not be considered to be bound by this hypothesis. After the paint has been applied to a substrate, and while it is being dried, either under ambient conditions or at elevated temperatures, oxygen enters the film by diffusion. Oxygen is consumed by the olefinic drying oil groups to form hydroperoxides and peroxides as potential oxidative crosslinking sites on the alkyd. Cobalt-catalyzed oxidation of the olefinic unsaturation in the alkyd forms hydroperoxides. Simultaneously, cobalt ions, regenerated from an oxime-blocked complex, decompose the hydroperoxides to peroxides. The cobalt ions then couple with the peroxides to create a redox catalyst pair. This pair initiates copolymerization of the reactive monomer with the unsaturated backbone of the alkyd.

Conventional alkyd compositions can be used as the alkyd component of coating compositions of the invention. It is desirable for the alkyd to contain at least a small amount of maleic anhydride, such as at least about 1%. Alkyds generally are made by condensation copolymerization of a dibasic acid, a monobasic acid, and a polyol.

The three components are heated together in a one or more step process, with or without solvent, to give a polyester. Azeotropic processes may be used to advantage. U.S. Pat. No. 4,045,392—Callahan and Coe (Aug. 30, 1977) discloses an improved alkyd resin manufacturing process using water or steam to reverse or retard gelation. Such a process may be used advantageously.

For the alkyd composition itself, suitable starting materials include linseed or soya oil fatty acids; phthalic anhydride, adipic acid or isophthalic acid; benzoic acid or tertbutyl benzoic acid; and pentaerythritol or glycerine, trimethylol ethane, trimethylol propane, neopentyl glycol, or trimethylpentane diol.

Typical alkyds are made by the copolymerization of phthalic anhydride (equivalent to a dibasic acid), a fatty acid and glycerol. Multiple double bonds in the carbon chain of the fatty acid enable the alkyd to dry through oxidative crosslinking.

With compositions and processes of the present invention, methacrylate monomers act as a solvent until oxidative crosslinking commences. Then they polymerize into the resin film by reacting with the alkyd through a vinyl polymerization mechanism.

Also, aqueous coating compositions can be provided in accordance with the invention if the alkyd is made compatible with water. Such alkyd resins can be made from isophthalic acid, trimellitic anhydride, tall oil fatty acids, and trimethyl pentane diol. For aqueous coating compositions, it is desirable for the alkyd resins to have an acid number of 40 to 60 and a hydroxy number of 210 to 260, and for them to contain sufficient ammonia or amine to provide a pH about in the range of 7 to 9.

The di- and trimethacrylates have been found to be much more reactive in high-solids coating compositions of the invention than monomethacrylates such as dicyclopentadiene methacrylate. This permits much more rapid curing and/or the use of lowered temperatures for curing and thus increases the likelihood of obtaining a practical system.

The requirement that the methacrylate be present as a monomer is for the purpose of obtaining a minimum viscosity so that a maximum solids content can be achieved in a practical paint. Of course, the use of some dimers or oligomers of methacrylates may not substantially change the results and thus may be equivalent to and within the invention.

In contrast to acrylates, the methacrylate monomers used in the invention are less toxic and more reactive, giving faster cures at lower temperatures.

In the present invention, dimethacrylates appear to be used more efficiently than trimethacrylates. Apparently, only about two methacrylate groups from each monomer, on the average, are actually polymerizable with the alkyd chains. Thus, trimethacrylates can be used, but dimethacrylates are preferred, at least for some purposes. Over about 25% trimethylpropane trimethacrylate leads to undesirable brittleness in the cured paint film. Less than about 10% of any of the methacrylates fails to give the advantages of the invention in terms of high-solids coating compositions and tends, instead, to be merely a methacrylate modification of the alkyd paint itself.

Cobalt salts protected with a suitable complexing agent such as oximes must be used in coating compositions of the invention to obtain rapid drying to a desirable film structure. The reason for this is not known, but it is probably related to the sensitive balance between the action of the catalyst in opening the hydroperoxide bond on the alkyd for oxidative crosslinking; the prevention of gelation on the surface or throughout the paint during its useful life; and the formation of a cobalt peroxide for initiating the subsequent vinyl polymerization. For satisfactory blocking of the cobalt, it is desirable to use oximes in an amount of 4-6 times the mols of cobalt. Preferably, the cobalt is used at levels of 0.05 to 1.5% equivalent metal content. Various soluble cobalt salts are suitable.

Salts of other metals, known in the trade to work as auxiliary driers, may also be used along with the cobalt salts. For instance, up to 1.0% equivalent metal content of salts of calcium, zirconium or lead optionally may be used. In addition to inducing or accelerating drying, they also promote better water resistance, film hardness, compatability and other desirable properties. Paint dryer technology is discussed in "Treatise on Coatings," Volume 3, Pigments, Part 1, in article on "Additives" by E. Singer. pp. 11–14. The treatise is edited by Myers and Long and published by Marcel Dekker (New York) in 1975.

It has been found that it is quite desirable to use polar solvents in coating compositions of the invention, especially with lower levels of methacrylate monomer. While it is possible, and perhaps sometimes desirable, to have nonpolar solvents present, polar solvents should also be provided, preferably in an amount of at least 10% by weight of the coating composition. The methacrylate monomers also serve as polar solvents until they react with the alkyd resin to become part of the coating solids.

The improved dry paint film hardness obtained when the solvent is a highly polar solvent such as butanol may be due in part to stabilization of hydroperoxides formed on the alkyd chains. The solvent may intereferre with decomposition of the hydroperoxides by forming a stable intermediate involving hydrogen bonding with the hydroperoxides, such as using an alcohol solvent:

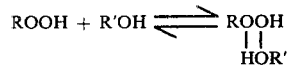

Although such interference with hydroperoxide decomposition seems undesirable in conventional alkyd crosslinking, it may be helpful with the present invention. A stable peroxide is desired to form a cobalt-peroxide pair which is a low-temperature vinyl polymerization initiator. This would encourage copolymerization of the alkyd and the methacrylate monomer.

In addition to stabilizing hydroperoxides, it may be that lower volatility polar solvents also aid in keeping the film open longer. This minimizes skin formation and allows more oxygen to diffuse into the film. Oxygen is more soluble in more highly polar solvents, and this too can aid in curing the film.

Coating compositions of the invention may also contain additional paint constituents used in the art including plasticizers, such as dibutyl fumarate, dibutyl itaconate, and dibutyl sebacate. Hydrocarbon resin modifiers based on such monomers as dicyclopentadiene, dipentene, B-pinene and styrene may be used to promote lacquer dry. Additives can be used to prevent wrinkling and for other purposes, such as phenolic varnishes and silicone resins. Pigments and fillers known in the art can be used, so long as they do not deleteriously interact with the alkyd-monomer stability and curing mechanism.

The following examples illustrate the invention.

EXAMPLE I

ALKYD PREPARATION

|  | Parts |
| --- | ---: |
| Linseed oil fatty acids | 362.0 |
| Phthalic anhydride | 251.5 |
| Maleic anhydride | 5.3 |
| Benzoic acid | 119.1 |
| Pentaerythritol | 262.1 |

The ingredients were mixed with 5% xylene as an azeotroping solvent, heated under nitrogen to 230° C. and held there until an acid number of 14–17 was obtained. The reaction product was then mixed with butanol solvent to obtain a solids content of 80% and a viscosity of Z5-Z6 Gardner-Holdt.

EXAMPLE II
WHITE PAINT

Seven parts of the alkyd of Example I were mixed with one part trimethylolpropane trimethacrylate, 0.05% cobalt, 0.5% methyl ethyl ketone oxime, and a titania pigment at a ratio of pigment to binder of 85/100.

When coated on a substrate by conventional means such as spraying, the paint dried under ambient conditions (about 25° C., circulating air) to a tack-free condition in 4 hours. Alternately, it was cured to a tack-free condition in 30 minutes at 150° C., developing good resistance to water, oil and toluene.

EXAMPLE III
GREEN PAINT

A green paint was made by mixing 82.9% of the alkyd of Example I with 14.6% trimethylolpropane trimethacrylate, 2.4% butyl benzene phthalate, 0.05% cobalt, 0.5% methyl ethyl ketone oxime, and a green pigment. The pigment was a blend of chrome yellow, iron blue and titania pigments provided at a ratio of pigment to binder of 31/100.

When coated on a substrate, the resulting paint film was dried in 40 minutes at 107° C. to a pencil hardness of 2B, developing good resistance to water, oil and toluene.

EXAMPLE IV
METHACRYLATE COMPARISONS

Paints of the invention made by comparable techniques using the alkyd of Example 1, but with the methacrylates varied, showed the minor advantage of one trimethacrylate over a dimethacrylate and the major advantages of both over a monomethacrylate. The paints included 0.15% cobalt and 1.3% methyl ethyl ketone oxime and had a ratio of white titania pigment to binder of 85/100.

The following table shows the results in terms of drying time to a tack-free condition, Knoop hardness of the film after 24 hours of air drying under ambient conditions, and the resistance to softening by toluene in minutes of exposure:

TABLE 1

| Monomer | Ratio-Alkyd to Monomer | Dry Time | 24 Hr. Knoop | Toluene Resistance (min.) |
|---|---|---|---|---|
| 1. Trimethylolpropane trimethacrylate | 75/25 | 5–6 Hrs. | 2.6 | 10 |
| 2. Butanediol dimethacrylate | 75/25 | 6–7 Hrs. | 0.8 | 8.0 |
| 3. Dicyclopentadiene methacrylate | 75/25 | 3–4 Days | 0 | 0.7 |

EXAMPLE VI
COBALT DRIER

A satisfactory composition of the invention was made using the following ingredients:
  70% alkyd resin,
  25% hexanediol dimethacrylate,
  5% dibutyl phthalate,
  0.1% cobalt,
  0.4% methyl ethyl ketone oxime, and
  20% isopropyl alcohol.

EXAMPLE VII
AUXILIARY DRIERS

Further satisfactory coating compositions of the invention were made using the following ingredients:
  80% alkyd resin,
  17.5% neopentyl glycol dimethacrylate,
  2.5% dibutyl phthalate
  0.1% cobalt
  0.4% calcium
  0.15% zirconium
  0.4% methyl ethyl ketone oxime, and
  20% isopropyl alcohol.

I claim:

1. A coating composition comprising
   an unsaturated fatty acid alkyd resin,
   an alkyd dimethacrylate or trimethacrylate monomer,
   a cobalt salt effective as a catalyst for the oxidation crosslinking of the alkyd resin, and for initiating vinyl polymerization,
   a complexing agent to block the cobalt catalyst, and
   a polar solvent;
   wherein the coating composition contains by weight, based on the alkyd resin plus the methacrylate monomer, at least about 50% of the alkyd resin, about from 10 to 40% by weight of the methacrylate monomer, and at least about 10% polar solvent.

2. The coating composition of claim 1 wherein the alkyd resin contains units of maleic anhydride.

3. The coating composition of claim 1 wherein the methacrylate monomer is selected from
   pentaerythritol trimethacrylate,
   trimethylol propane trimethacrylate,
   trimethylol ethane trimethacrylate,
   1,4-butanediol dimethacrylate,
   hexanediol dimethacrylate,
   propylene glycol dimethacrylate,
   ethylene glycol dimethacrylate, and
   neopentyl glycol dimethacrylate.

4. The coating composition of claim 3 wherein the methacrylate monomer is trimethylol propane trimethacrylate.

5. The coating composition of claim 4 wherein the trimethylol propane trimethacrylate is provided in an amount of 15 to 25%.

6. The coating composition of claim 3 wherein the methacrylate monomer is hexanediol dimethacrylate.

7. The coating composition of claim 3 wherein the methacrylate monomer is neopentyl glycol dimethacrylate.

8. The coating composition of claim 3 wherein the methacrylate monomer is 1,4-butanediol dimethacrylate.

9. The coating composition of claim 1 wherein the complexing agent is an oxime.

10. The coating composition of claim 9 wherein the oxime is ethyl ketone oxime.

11. The coating composition of claim 10 wherein the coating composition contains about 0.1% cobalt and about 0.4% methyl ethyl ketone oxime.

12. The coating composition of claim 1 wherein the solvent iss butanol.

13. The coating composition of claim 1 wherein the solvent is isopropyl alcohol.

14. The coating composition of claim 1 wherein the cobalt salt is present in the range, by weight of metal equivalent, of 0.05–0.15%.

15. The coating composition of claim 1 also containing up to 1.0%, by weight of metal equivalent, of salts of one or more of calcium, zirconium and lead, such salts being effective as auxiliary driers.

16. The coating composition of claim 15 wherein calcium salt is present in the range of 0.2–0.4%.

17. The coating composition of claim 15 wherein zirconium salt is present in the range of 0.1–0.6%.

18. The coating composition of claim 1 containing, by weight, about
   70% alkyd resin,
   25% hexanediol dimethacrylate,
   5% dibutyl phthalate,
   0.1% cobalt,
   0.4% methyl ethyl ketone oxime, and
   20% isopropyl alcohol.

19. The coating composition of claim 15 containing, by weight, about
   80% alkyd resin,
   17.5% neopentyl glycol dimethacrylate,
   2.5% dibutyl phthalate
   0.1% cobalt
   0.4% calcium
   0.15% zirconium
   0.4% methyl ethyl ketone oxime, and
   20% isopropyl alcohol.

20. The coating composition of claim 1 wherein the solvent contains 20–85%, by weight, water.

21. A process of providing a substrate with a cured coating of the composition of claim 1 wherein said coating composition is applied to the substrate and then cured by baking at temperatures in the range of 58°–82° C.

* * * * *